United States Patent [19]

Bork et al.

[11] 4,371,881

[45] Feb. 1, 1983

[54] PIVOTABLE INK-REPELLING SCREEN FOR THE WRITING HEAD OF AN INK RECORDING DEVICE

[75] Inventors: Klaus Bork; Alfred Rueckerl, both of Munich, Fed. Rep. of Germany

[73] Assignee: Siemens Aktiengesellschaft, Berlin & Munich, Fed. Rep. of Germany

[21] Appl. No.: 269,568

[22] Filed: Jun. 2, 1981

[30] Foreign Application Priority Data

Jun. 11, 1980 [DE] Fed. Rep. of Germany ....... 3021913

[51] Int. Cl.$^{3}$ ........................................ G01D 15/18

[52] U.S. Cl. ........................................ 346/140 R

[58] Field of Search ........................... 346/140 R, 75

[56] References Cited

U.S. PATENT DOCUMENTS 4,112,435 9/1978 Kattner et al. .................... 346/140

4,144,537 3/1979 Kimura ........................... 346/140 R 4,296,418 10/1981 Yamazari .................... 346/140 R X

FOREIGN PATENT DOCUMENTS 2702663 7/1978 Fed. Rep. of Germany .

2742963 1/1980 Fed. Rep. of Germany .

*Primary Examiner*—Joseph W. Hartary

*Attorney, Agent, or Firm*—Hill, Van Santen, Steadman, Chiara & Simpson

[57] ABSTRACT

A pivotable ink shield is provided for cooperation with the writing head of an ink recording device whereby the shield is movable relative to writing head ink dispensing openings to shield, wipe, and permit flushing of the writing head outlets. The shield element is pivotally connected to a pivotally movable carriage bracket. The carriage bracket is connected with a latch mechanism operated by an electromagnet which enables the carriage bracket to be released under the bias of a resilient force removing the shield between an operating position, permitting ink jet printing on a recording medium, and a blocking position, for plugging the outlet openings of the writing head. The shield element is provided with a resilient wiper element and a closure plate portion such that the outlet openings are first wiped by the wiper element and then closed with the plate as the shield is brought into its blocking position. To clear the outlet openings of dirt, the shield element is separately pivotable relative to the carriage bracket into a flushing position which removes the closure plate portion from the outlet openings, allowing pressure burst cleaning of the writing head outlets.

13 Claims, 9 Drawing Figures

PIVOTABLE INK-REPELLING SCREEN FOR THE WRITING HEAD OF AN INK RECORDING DEVICE

BACKGROUND OF THE INVENTION

1. Field of the Invention

The invention relates to ink recording devices and, more particularly, to a pivotable ink shield for the writing head which is pivotably movable to shield, wipe, and permit flushing of writing head dispensing openings.

2. The Prior Art

In the case of typical ink recording devices, a writing head is moved in line-by-line fashion along a recording medium on a driven writing head carrier. The writing head can, in some presently used embodiments, be an ink mosaic writing head in which piezoelectrically operated writing jets or dispensing openings are arranged in a mosaic pattern. The writing jets are supplied with writing liquid or ink from an ink supply and the individual jets are controllably actuated by a character generator. The jets of the writing head are formed by somewhat cylindrical bores which are surrounded by piezoelectric drive elements. The operating open ends of the bores are located at an end face of the writing head and a nozzle plate may be provided on the end face.

In normal practice, writing heads of the above-described type are positioned in close space relationship to the recording medium, which may be a roll of paper. Due to this close positioning dirt will oftentimes become lodged against the nozzle plate with attendant adverse operating results. Such dirt contamination of the nozzle plate is frequently encountered during paper change or change to other recording medium carriers as may be used in the particular construction. Since the piezoelectrically operated writing jets are constantly filled with ink, the danger also exists that, during changing of the recording medium, the recording medium will be pulled passed the jet openings of the writing head and thereby sprayed or smeared with ink.

The German AS No. 2702663 discloses an arrangement whereby plastic plug members are used to close the jets of a writing head during periods of non-printing. The plug members are moved via a drive device between a rest position wherein the plug members cover the bore exits of the writing head with an elastic covering plate and an operating position wherein the plug members are positioned away from the writing head. One drawback with this arrangement, however, is that the plug members are fixedly positioned on the writing device so that the writing head must be brought to a specific position for the plug members to cover the jet openings.

U.S. Pat. No. 4,112,435 discloses a screen or plate member for protecting and cleaning the jet outlet openings of an ink mosaic writing head. The screen is pivotable against a spring force via an electromagnet drive means between a blocking position along the jet outlets and an operating position away from the jet outlet openings. A resilient wiper element, fastened to the screen, sweeps over the jet outlet openings during movement of the screen from the blocking to the operating positions. The electromagnet drive means engages with a lever arm connected to the screen for movement of the screen between its two positions.

The German OS No. 2742963 discloses an electric motor drive linkage arrangement for pivoting an ink shield between a blocking position when the writing head is not to be used and an operating position whenever the writing head is to be used. The ink shield is formed with a window opening which is positioned in front of the jet outlet openings of the writing head in the operating position and is fastened directly onto the writing head.

These above-mentioned prior art devices are each of relatively complicated construction not readily practical for protecting and cleaning ink dispensing openings of a writing head. The problem is to provide for an ink shield and associated drive mechanism which makes it possible to automatically close writing head outlet openings during rather long pauses between printing operations and to effectively clean the plurality of ink dispensing openings. A very effective way in which ink dispensing openings may be cleaned is to provide for periodic flushing of the outlet openings. The present invention provides for a simple constructional arrangement whereby writing head dispensing openings may be shielded, wiped, and permitted to flush during pauses in printing operation.

SUMMARY OF THE INVENTION

A pivotally movable ink shield or cap element is mounted on the writing head of an ink printing or recording device. The shield element is pivotally mounted to a carriage bracket which is secured for pivotal movement on the writing head. The carriage bracket is biased by a resilient force means to a position causing the shield to block the dispensing outlet openings of the writing head. The shield is formed with a wiper element which first sweeps over the jet openings and cleans them just prior to the positioning of an elastic plug member which covers the outlet openings in the blocking position of the cap element. A window opening is formed in the cap element which permits ink to be passed from the writing head onto a recording medium during printing operation. The window opening is positioned across from the writing head outlet openings in an operating position of the shield element. A locking lever is provided which acts as a stop surface against an edge portion of the carriage bracket to hold the carriage bracket and shield element in the operating position.

To pass the shield element into its blocking position, an electromagnet means, which holds the locking lever in engagement with the carriage bracket edge against the bias of a spring force, is released, whereby the locking lever unlatches the carriage bracket and the biasing force on the carriage bracket causes the shield element to automatically pass into its blocking position. A further force may then be applied against the shield element to pivot the shield relative to the carriage bracket in order to lift the plug member up off the outlet openings of the jets enabling the jets to be flushed. The ink flowing out of the jet openings during flushing is automatically drained away from the writing head along surface portions of the shield element without thereby dirtying the recording medium.

Shielding, wiping, and flushing operations may be undertaken, in accordance with the present invention, during non-printing periods, such as, for example, during non-use of the writing head during rather long pauses in printing, during changing of the recording medium or recording medium carrier, and during periods of power failure.

DESCRIPTION OF THE PREFERRED EMBODIMENTS

Figure 1:
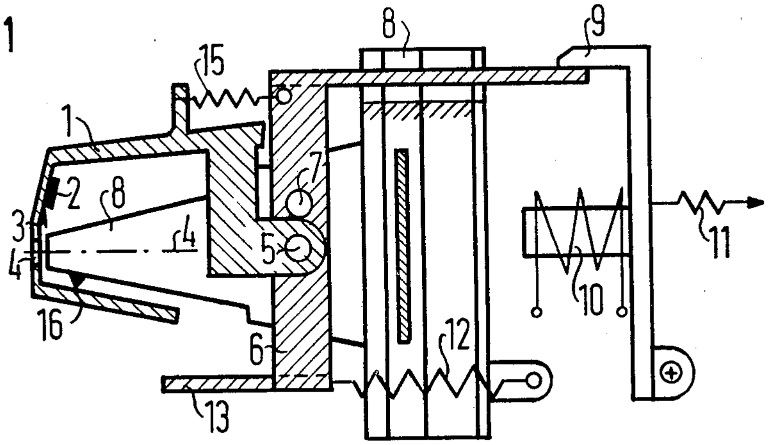
FIG. 1 is a schematic, top cross-sectional view of an ink shield arrangement constructed in accordance with a first embodiment of the present invention, wherein the shield element is in its operating position.
Figure 2:
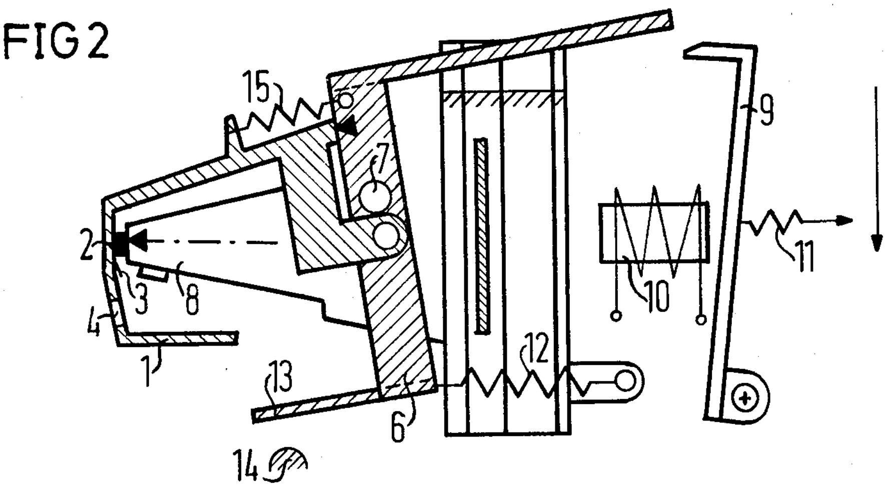
FIG. 2 is a schematic, top cross-sectional view of the device of FIG. 1, wherein the shield element is in its blocking position.
Figure 3:
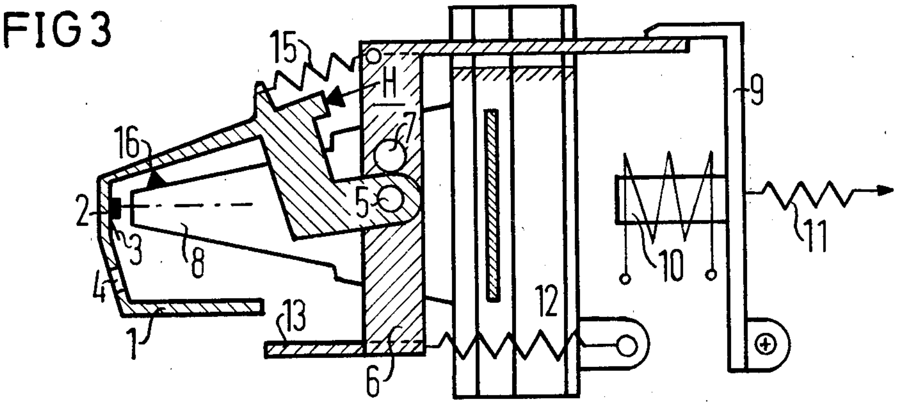
FIG. 3 is a schematic, top cross-sectional view of the device of FIG. 1, wherein the shield element is in its flushing position.

FIGS. 1–3 illustrate a first embodiment of the present invention, wherein a writing head 8 for an ink recording device, such as a mosaic printer, is suspended on a carrier mechanism positioned in close proximity to a recording medium. By means of a drive mechanism (not shown), the writing head 8 will be moved in line-by-line fashion across the recording medium. The writing head includes a number of cylindrical bores supplied with writing fluid from an ink supply (not shown). The bores are surrounded by piezoelectric drive elements controlled by a character generator for activation of the individual ink jets or dispensing openings through which ink is emitted onto the recording medium.

In order to protect the recording medium from accidental contamination from the writing head, as well as to protect the writing head from dirt accumulation, there is provided an ink shield or cap element 1 which substantially encloses the printing side of the writing head 8. The shield element is formed with an elastic plug member 2, which acts as a dispensing opening closure plate, a resilient wiping flap element 3, and a window opening 4, which enables ink jet droplets to pass therethrough from the writing head 8 onto the recording medium, arranged in a single row. The shield element 1 is pivotally mounted on pin means 5 connected to a carriage bracket 6, which is pivotally mounted on the writing head 8 via pin means 7.

A rearwardly extending edge surface of the carriage bracket 6 engages with a cooperating stop surface portion of a pivotally mounted locking lever or latch element 9. The latch element 9 is connected with a release means comprising a spring member 11 for biasing the latch 9 out of engagement with the edge portion of the carriage bracket 6 and an electromagnet 10, which, when activated, holds the locking lever 9 in is upright, locking position against the bias of the spring 11.

A resilient, biasing means, depicted here as a coil spring 12, connects with the end of the carriage bracket 6 opposed from the stop edge surface to tilt the carriage bracket relative to the writing head 8 when the latch element 9 is released. It is also within the contemplation of the present invention that, in place of the locking lever 9, the electromagnet 10, and return spring 11 arrangement depicted, a bimetal spring arrangement may also be utilized to hold and release the carriage bracket 6.

In the position illustrated in FIG. 1, the shield element 1 is in an operating position whereby the window opening 4 is located across from the writing head dispensing openings for printing of the recording medium. In this operational position, the shield element 1 also serves as a protective cap over the writing head 8 in order to prevent, for example, soiling of the recording medium which is located behind the shield element opposed from the writing head 8. To protect the recording medium from accidental contamination from the writing head during non-printing periods, such as during relatively long pauses in printing operation, the shield element 1 is moved to a blocking position shown in FIG. 2. This blocking position is arrived at by deactivating the electromagnet 10, such that the return spring 11 pulls the locking lever 9 away from the carriage bracket 6 and the spring 12 causes pivoting of the far end of the carriage bracket toward the writing head dispensing openings. The shield element 1, arranged upon the carriage bracket 6, is thus pivoted across the writing head dispensing openings such that the wiper element 3 first sweeps over the jet openings and cleans them and then the closure plate portion 2 is placed against the front of the dispensing openings.

A fin or edge surface portion 13 connected to the lever body of the carriage bracket 6 engages with a stationary stop member 14, positioned a suitable distance beneath the writing head carriage. To again open the writing head outlets, the carriage bracket 6 is raised back to its initial upright position, whereupon, with the electromagnet 10 suitably activated, the locking lever 9 again latches the carriage bracket.

In order to dislodge dirt from the riding head dispensing openings, the inventive construction enables the shield element 1 to be placed in a flushing position shown in FIG. 3, which allows pressure burst cleaning or rinsing of the outlets of the writing head. The flushing position is attained by application of a force H against the shield 1 which causes the shield to pivot about its pin support 5 against a return force biasing means, shown as spring 15, which causes the closure plate 2 to move out away from the writing head outlets. Pivotable movement of the writing head 1 in the flushing position is limited by means of stop elements 16 which are attached to the writing head 8. As the writing head outlets are flushed, by means of a pressure burst in the ink supply system, the recording medium is protected from soiling by the surface of the shield element 1 and released ink is conducted away from the writing head. Removal of the force H enables the spring 15 to return the shield element 1 to its operating position of FIG. 1.

Figure 4:
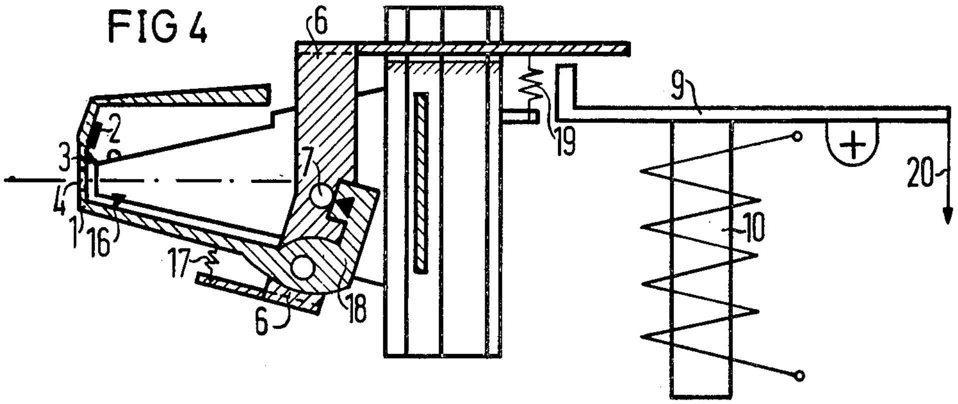
FIG. 4 is a schematic, top cross-sectional view of an ink shield arrangement constructed in accordance with a second embodiment of the present invention, wherein the shield element is in its operating position.
Figure 5:
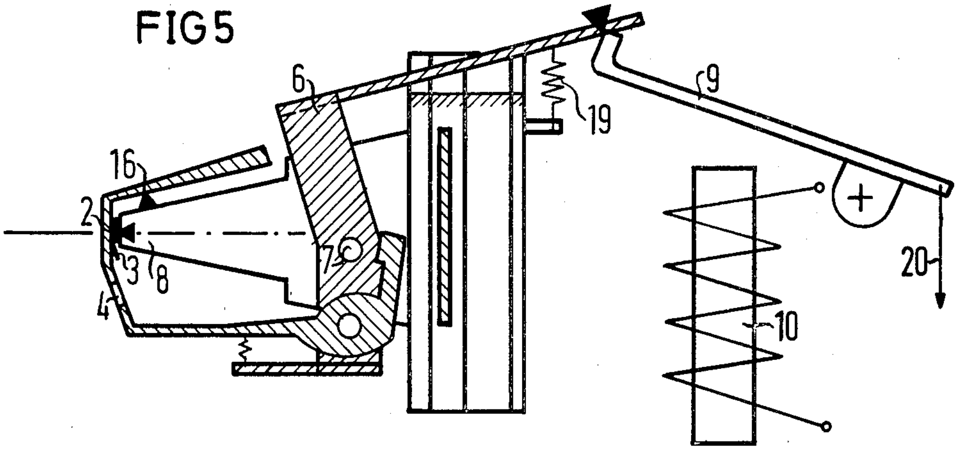
FIG. 5 is a schematic, top cross-sectional view of the device of FIG. 4, wherein the shield element is in its blocking position.
Figure 6:
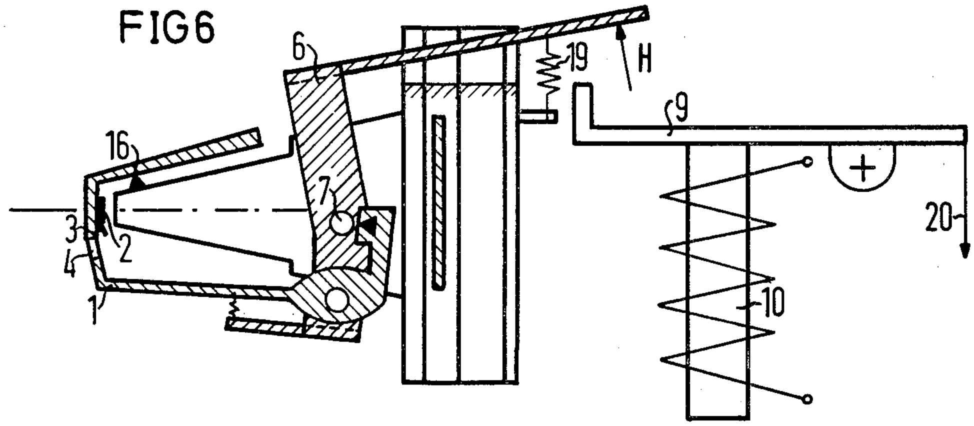
FIG. 6 is a schematic, top cross-sectional view of the device of FIG. 4, wherein the shield element is in its flushing position.

FIGS. 4–6 illustrate a second embodiment of the present invention, wherein previously referred to elements retain their reference numerals. By virtue of the arrangement shown in FIGS. 4–6, relative positioning of the shield element 1 is always adjustable. The shield element 1 is again hingedly connected to a lever portion of the carriage bracket 6 and a spring biasing member 17 extends between the shield element 1 and a side edge or lip surface connected to the carriage bracket. Adjacent the pin connection between the shield element 1 and the carriage bracket, there is formed an extended portion 18 of the shield having an end surface which acts as a stop against the pin means 7 for limiting pivoting movement in one direction of the shield element.

A spring member 19 holds the carriage bracket 6 in a generally upright position as shown in FIG. 4, so that the shield element is placed in its operating position whereby the window opening 4 is in front of the writing head outlets. For movement of the shield element 1 to its blocking position, the electromagnet 10 is deactivated, whereupon the lever means 9 pivots upward under the effect of a spring force means 20 to engage with the cooperating edge surface of the carriage bracket 6. This action causes the carriage bracket to pivot about its pin member 7 and the shield element 1 to rest against the stops 16 arranged on the writing head 8, bringing the shield element 1 into its blocking position as shown in FIG. 5. During this movement, the wiper element 3 cleans the dispensing openings of the writing head just prior to placement of the closure plate 2 across the outlet openings.

To bring the ink shield into its flushing position, as shown in FIG. 6, the latch lever 9 is again lowered by activation of the electromagnet 10 and a holding force H is applied to the edge surface of the carriage bracket 6 so that, through action of the spring 17, the shield element 1 is pivoted away from closed engagement with the writing head dispensing openings. This positioning of the shield element may also be brought about by a partial lowering of the latch lever 9, so that the carriage bracket 6 pivots about its hinge connection 7 and the closure plate 2 is raised up from the ink dispensing openings as a result of the brief movement of the carriage bracket 6.

Figure 7:
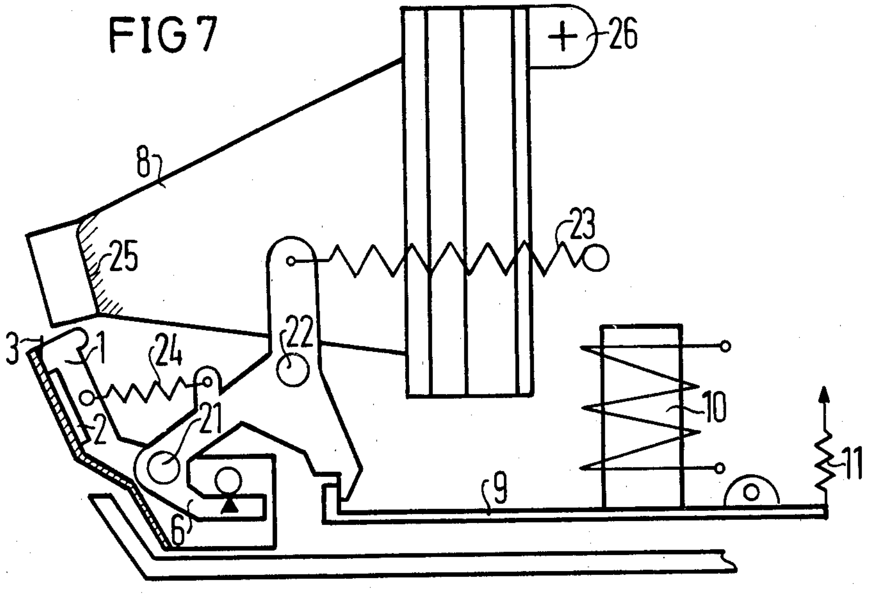
FIG. 7 is a schematic, side cross-sectional view of an ink shield arrangement constructed in accordance with a third embodiment of the present invention, wherein the shield element is in its operating position.
Figure 8:
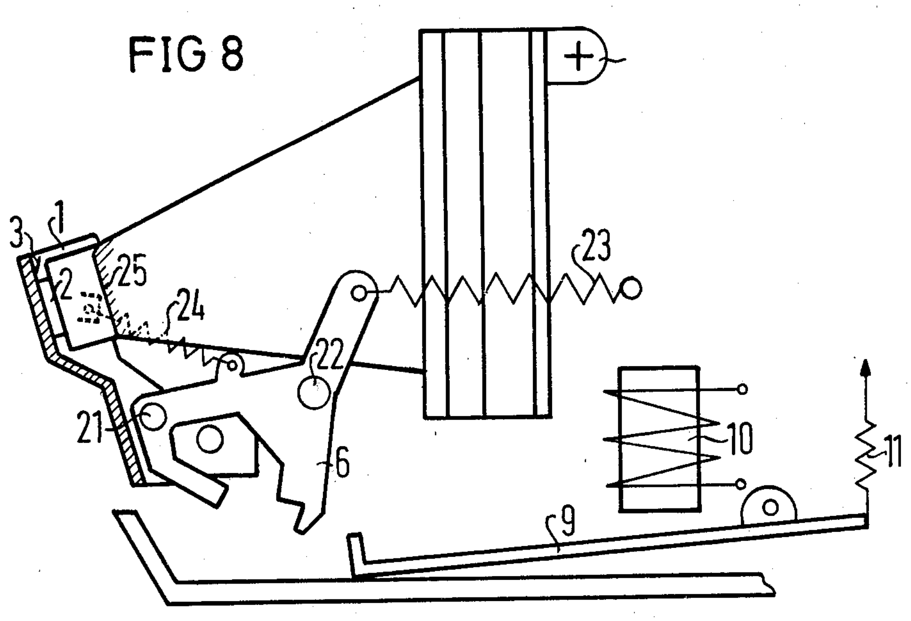
FIG. 8 is a schematic, side cross-sectional view of the device of FIG. 7, wherein the shield element is in its blocking position.
Figure 9:
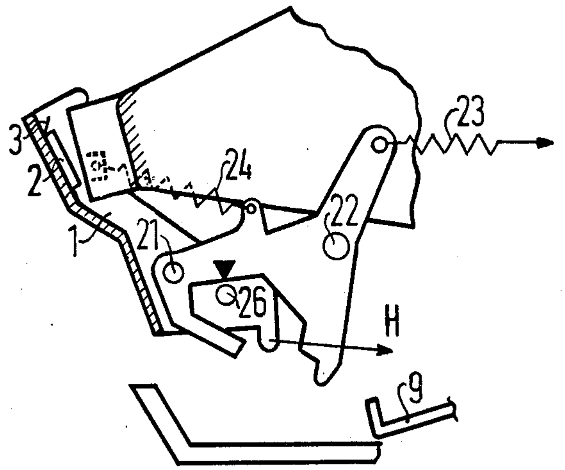
FIG. 9 is a schematic, side cross-sectional view of the device of FIG. 7, wherein the shield element is in its flushing position.

FIGS. 7–9 illustrate a third embodiment of the present invention, with previously referred to elements pertaining their reference numerals, wherein the shield element 1 does not contain a window opening and is movable in a vertical plane between an operating position beneath and out of the way of the writing head outlet openings and a blocking position in front of the writing head. In this embodiment, the writing head 8 is pivotally mounted about a hinge point 26 on the writing head carriage. The shield element 1 is positioned beneath the writing head during printing operation, as shown in FIG. 7. The shield element is again pivotally connected to the carriage bracket 6 at a hinge connection 21. A spring member 23, extending between the carriage bracket 6 and a point on the writing head carriage, provides a return biasing force on the bracket 6. The carriage bracket is mounted for pivotal movement on the writing head carriage via a pin connection 22. Intermediate of the hinge connections 21 and 22, there is provided an upraised portion on the carriage bracket 6 from which a spring 24 extends to the shield element 1. In the operating position shown in FIG. 7, the spring 24 is in a relaxed state. The carriage bracket 6 is held in the position shown in FIG. 7 by means of stop engagement with the latching lever 9, which is held in its locking position against the return force of spring 11 by the electromagnet 10.

To bring the shield element into a blocking position, the electromagnet 10 is deactivated so that the latch 9 pivots downward out of engagement with the carriage bracket 6 under the influence of the spring 11. As shown in FIG. 8, the thus released carriage bracket 6 pivots about its hinge 22, such that the shield 1 rides up along surface arms 25 arranged on the writing head 8 into the blocking position for wiping and closing the dispensing openings. The spring 24 causes the closure plate 2 to be pressed against the writing head outlet openings. An abutment arrangement, analogous to members 13 and 14 shown in FIG. 2, is provided to limit movement of the released carriage bracket 6.

FIG. 9 illustrates the shield element 1 in its flushing position in accordance with the third embodiment of the invention. A holding force H is applied to a lower portion of the shield element, such that the closure plate portion 2 is pivoted about the pin connection 21 out away from the writing head outlet openings against the return force of the spring 24. A stop member 26 limits deflection of the shield element in this manner.

Although various minor modifications may be suggested by those versed in the art, it should be understood that we wish to embody within the scope of the patent warranted hereon all such modifications as reasonably and properly come within the scope of our contribution to the art.

We claim as our invention:

1. Apparatus for shielding and cleaning a writing head for an ink recording device having a plurality of ink dispensing openings comprising a shield member substantially enclosing said writing head adjacent said openings and movable between a position unobstructive to flow from said openings and a position blocking said openings, said shield member having a resilient flap element and a closure portion attached thereto, whereby movement of said shield member to said blocking position causes said flap element to first wipe said openings followed by said closure portion covering said openings.

2. The apparatus of claim 1, wherein said shield member is pivotally mounted relative to said writing head enabling said shield member to move away from said openings for flushing of said openings.

3. The apparatus of claim 2, further comprising a carriage means pivotally mounted to said writing head, said shield member being pivotally mounted to said carriage means.

4. Apparatus for shielding and cleaning a writing head for an ink recording device having a plurality of ink dispensing openings comprising a carriage means mounted for movement relative to said writing head and a shield member pivotably mounted to said carriage means and formed with a resilient wiper element and a closure portion whereby said shield member is movable between a first position unobstructive of flow from said openings, a second position blocking said openings with said closure portion after first sweeping said openings with said wiper element, and a third position lifting said closure portion off said openings to permit flushing of said openings.

5. The apparatus of claim 4, further comprising first resilient biasing means acting on said carriage means, a latch means for holding said carriage means against movement under the influence of said first biasing means, and means for releasing said latch means from engagement with said carriage means such that said shield member is moved from its first position to its second position.

6. The apparatus of claim 5, further comprising a second resilient biasing means against which said shield member is pivotably movable relative to said carriage means into said third position.

7. The apparatus of claim 6, wherein said shield member is placed beneath said openings in said first position.

8. The apparatus of claim 5, wherein said means for releasing comprises an electromagnet means.

9. The apparatus of claim 4, wherein said shield member is formed with a window opening which is placed in front of said openings when said shield member is in said first position.

10. The apparatus of claim 4, further comprising a first resilient biasing means acting on said carriage means, a spring-actuated lever means for selectively engaging said carriage means to pivot said carriage means against the influence of said first biasing means, and means for releasing said lever means for engagement with said carriage means such that said shield member is moved from said first position to said second position.

11. The apparatus of claim 10, further comprising a second resilient biasing means against which said shield member is pivotably movable relative to said carriage means into said third position.

12. The apparatus of claim 11, further comprising stop means for limiting pivotal movement of said shield member relative to said carriage means.

13. The apparatus of claim 12, wherein said shield member is formed with a window opening which is placed in front of said openings when said shield member is in said first position.

* * * * *